US009719475B2

(12) United States Patent
Thorwirth et al.

(10) Patent No.: US 9,719,475 B2
(45) Date of Patent: *Aug. 1, 2017

(54) CONTROL VALVE, IN PARTICULAR FOR METERING IN A FLUID FOR A DELIVERY PUMP WHICH IS ARRANGED DOWNSTREAM

(71) Applicant: Robert Bosch GmbH, Stuttgart (DE)

(72) Inventors: Erik Thorwirth, Lohfelden (DE); Winfried Eckart, Ludwigsburg (DE); Dominik Brunner, Stuttgart (DE); Christian Heinen, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

This patent is subject to a terminal disclaimer.

(21) Appl. No.: 14/859,793

(22) Filed: Sep. 21, 2015

(65) Prior Publication Data
US 2016/0010612 A1    Jan. 14, 2016

Related U.S. Application Data (63) Continuation of application No. 13/513,477, filed as application No. PCT/EP2010/065320 on Oct. 13, 2010, now Pat. No. 9,181,910.

(30) Foreign Application Priority Data

Dec. 1, 2009    (DE) .......................... 10 2009 047 326
Aug. 24, 2010   (DE) .......................... 10 2010 039 691

(51) Int. Cl.
*F16K 31/06*    (2006.01)
*F02M 63/00*    (2006.01)
(Continued)

(52) U.S. Cl.
CPC ...... *F02M 63/0031* (2013.01); *F02M 59/366* (2013.01); *F02M 63/0012* (2013.01);
(Continued)

(58) Field of Classification Search
CPC .... F04B 49/243; F02M 59/34; F02M 59/366; F02M 63/0031; F02M 63/0033;
(Continued)

(56) References Cited

U.S. PATENT DOCUMENTS 6,045,120 A    4/2000   Tarr et al.
6,345,608 B1   2/2002   Rembold et al.
(Continued)

FOREIGN PATENT DOCUMENTS

CN    1695005    11/2005
DE    19900883   9/1999
(Continued)

OTHER PUBLICATIONS

International Search Report for Application No. PCT/EP2010/065320 dated Feb. 11, 2011 (English Translation, 2 pages).

*Primary Examiner* — Matthew W Jellett
(74) *Attorney, Agent, or Firm* — Michael Best & Friedrich LLP (57) ABSTRACT

A control valve is provided, in particular for metering in a fluid for a delivery pump which is arranged downstream. The control valve has a flow channel, an axially movable valve needle, and a valve element which can be loaded by the valve needle in an opening direction and is arranged in the flow channel. If the valve element is actuated in the opening direction by the valve needle, the fluid can flow back through the flow channel at least temporarily counter to the opening direction of the valve element. Upstream of the valve element as viewed in the backflow direction, the flow (Continued)

channel has a fluidically active shield which keeps the backflow at least partially free of a face of the valve element.

19 Claims, 8 Drawing Sheets

(51) Int. Cl.
*F02M 59/36* (2006.01)
*F04B 53/10* (2006.01)

(52) U.S. Cl.
CPC .......... *F04B 53/10* (2013.01); *F16K 31/0696* (2013.01); *F02M 2200/09* (2013.01); *Y10T 137/85978* (2015.04)

(58) Field of Classification Search
CPC ............ F02M 2200/09; F02M 63/0078; F16K 31/0696; Y10T 137/85978; Y10T 137/86027
See application file for complete search history.

(56) References Cited

U.S. PATENT DOCUMENTS

| | | | |
|---|---|---|---|
| 6,631,706 B1 | 10/2003 | Yamada et al. | |
| 7,165,534 B2 | 1/2007 | Usui et al. | |
| 7,707,996 B2 | 5/2010 | Yamada et al. | |
| 7,717,089 B2 * | 5/2010 | Oda | F02M 59/464 123/506 |
| 7,819,637 B2 | 10/2010 | Oda et al. | |
| 8,070,462 B2 | 12/2011 | Inoue | |
| 8,206,131 B2 | 6/2012 | Suzuki et al. | |
| 8,226,379 B2 | 7/2012 | Furuta et al. | |
| 8,257,067 B2 * | 9/2012 | Fukui | F02M 59/366 417/505 |
| 8,529,220 B2 | 9/2013 | Suzuki et al. | |
| 2008/0237518 A1 | 10/2008 | Furuta et al. | |
| 2014/0117268 A1 * | 5/2014 | Deponte | F02M 59/366 251/366 |

FOREIGN PATENT DOCUMENTS

| | | |
|---|---|---|
| DE | 19834121 | 2/2000 |
| DE | 102007028960 | 12/2008 |
| EP | 1471248 | 10/2004 |
| JP | 63180775 | 7/1988 |
| JP | 2008248788 | 10/2008 |

* cited by examiner

CONTROL VALVE, IN PARTICULAR FOR METERING IN A FLUID FOR A DELIVERY PUMP WHICH IS ARRANGED DOWNSTREAM

CROSS-REFERENCE TO RELATED APPLICATIONS

This application is a continuation of U.S. application Ser. No. 13/513,477 filed Jun. 19, 2012, which is a 35 USC 371 application of PCT/EP 2010/065320 filed Oct. 13, 2010, which claims priority to both of German Patent Application 10 2009 047 326.2 filed Dec. 1, 2009 and German Patent Application 10 2010 039 691.5 filed Aug. 24, 2010, the entire contents of all of which are incorporated by reference herein.

BACKGROUND OF THE INVENTION

The invention relates to a control valve for metering a fluid for a delivery pump.

Control valves, particularly for metering a fluid for a downstream delivery pump, are known on the market. For instance, they are used in common rail fuel systems of motor vehicles as a quantity control valve, for controlling the fuel flow fed into the common rail from a high-pressure delivery pump. Such quantity control valves can be embodied as electromagnetic control valves, in which an electromagnet and a spring act on a valve element of the control valve. See German Patent Disclosure DE 198 34 121 A1, for example.

SUMMARY

The control valve of the invention has the advantage that flow forces at the valve element, when the control valve is actuated in the opening direction, are reduced without lessening the robustness of the control valve. As a result, the excitation of acoustic waves can be reduced as well.

For example, a control valve which is used as a quantity control valve for metering a quantity of fuel for a piston high-pressure delivery pump of an internal combustion engine functions as follows:

In an intake phase of the high-pressure delivery pump, the valve element disposed in a flow channel and embodied for instance as a valve plate is, as a consequence of pressure differences that occur beyond the valve element, put into an open position, as in a normal inlet valve actuated by a pressure difference, for instance as in DE 198 34 121 A1. This open position of the control valve can be reinforced by an electromagnetically actuated valve needle. If in an ensuing delivery stroke of the high-pressure delivery pump the pressure ratios are reversed, then by the action of the valve needle on the valve element, the control valve can continue to remain temporarily in the open position. In this phase, a partial backflow of the fuel already located in the high-pressure delivery pump takes place. The flow of fuel through the control valve is then the opposite of its "normal" flow direction. The backflowing fuel—without the provision according to the invention—then leads to a pressure on an axial end face of the valve element. This pressure has to be compensated for, at least from time to time, by the action of the valve needle.

The invention proceeds from the thought that the pressure which during the backflow acts on the axial end face of the valve element can be lessened by means of a bit. Thus the actuation force that has to be furnished by the valve needle can be reduced, and an electromagnet of the control valve does not need to be as strong. The impact speed of the valve needle or the valve element on a stop that limits its motion can be reduced as well. In this way, the control valve is also made less expensive, and it operates more quietly.

The shield is preferably disposed such that it essentially shields the axial end face of the valve element from the backflowing fuel but itself does not substantially hinder the backflowing fuel. For instance, the valve element is embodied as a valve plate around which the backflowing fuel is guided with little loss by means of the shield. The valve plate has two axial terminal positions. First, a seat of repose, which the valve plate strikes when the control valve is closed, and second, a stop for an open position of the control valve. In this open position, the valve plate in most instances of use is disposed quite close to the shield. There it can either touch the shield, or a gap remains; specifically, a constriction is opened up between the valve plate and the shield. This constriction does not represent the flow direction of the fuel, however; instead—in some embodiments of the invention— it forms a kind of channel to a region that is filled with fuel but essentially has no flow through it, as will be explained hereinafter. The stop for the open position of the control valve is not absolutely necessary.

The control valve is more simply constructed if the shield has an encompassing and for instance annular shield portion. The result is a structurally simple embodiment of the shield. The shield can almost always be used in a quantity control valve and can optionally also be used in existing embodiments without structural changes. As a result, the control valve is made simpler, and its production is made less expensive.

One embodiment of the control valve provides that the shield portion is conical. Thus the control valve can be embodied such that the flow losses of the flowing fuel are reduced especially markedly. This pertains to both the delivery direction and the backflow.

It is additionally proposed that the shield or at least the shield portion is a molded sheet-metal part. A molded sheet-metal part of this kind is especially easy to produce and especially inexpensive.

A further embodiment of the control valve provides that it includes at least one channel, which connects a flow region located outside the shield, in which region upon a backflow a comparatively low static pressure prevails, with a region located inside the shield. Preferably, the channel is oriented essentially orthogonally to the backflow. The channel can also be embodied in various ways and/or at various and virtually arbitrary portions of the flow channel, as will be explained further hereinafter. As a result, the electromagnetic actuating device, which moves the valve needle, can be made smaller. Consequently the power needed by the electromagnet can be lowered still more, and less heat, for instance in the armature winding, is generated.

An embodiment of the control valve provides that the channel is formed in at least some regions by a preferably radially encompassing gap between the valve element and the shield or the shield portion. The encompassing gap or channel is formed for instance whenever the valve element is in its opening position. The elements of the control valve are dimensioned such that the suction jet effect ensues with a desired intensity and in a desired direction, without a separate channel having to be produced. In this way, the channel can be implemented especially simply and inexpensively.

A further embodiment of the control valve provides that the channel is formed in at least some regions by at least one opening in the shield and/or in the shield portion. The opening can be oriented radially or diagonally or parallel to an axis of the control valve and can moreover have various kinds of cross-sectional shapes. For instance, the opening can be embodied as a bore. This provides many possibilities for connecting the region located inside the shield fluidically with the flow channel, so that—adapted to a particular structural form of the control valve—the desired suction jet effect ensues. It is equally possible for a plurality of openings to be provided, which are for instance arranged radially symmetrically to the axis of the control valve. In that case, the channel is accordingly always present, regardless of the position of the valve element. This has functional advantages.

A further embodiment of the control valve provides that the channel is formed in at least some regions by at least one opening in the valve element. For instance, the valve element has an essentially rotationally symmetrical and disklike geometry, and the flow or backflow flowing through the flow channel flows radially, in at least some portions, around an axial face of the valve element. In that case, the channel can be formed by axial openings in the vicinity of the edge of the valve element. This embodiment has the advantage that along the flow channel, no additional throttle restriction is required, and as a result, corresponding throttle losses in the suction direction are avoided.

A still further embodiment of the control valve provides that the flow region located outside the shield, into which region the channel discharges, is shaped such that the backflow is deflected. As a result, the channel discharges into the radially inner region of the crooked flow, in which region a pressure gradient can be established in the radial direction. The result in the radially inner flow region is a comparatively low pressure, which can be transmitted by means of the channel to the region located inside the shield. A further advantageous alternative version of the control valve is thus formed.

The control valve of the invention functions especially well if the backflow is guided essentially orthogonally to the channel. As a result, it is attained among other things that the function of the channel is essentially independent of the flow direction in the flow channel, so that when the flow direction changes, either no redistribution, or only a comparatively slight redistribution, of fluid through the channel occurs. As a result, hydraulic losses can be avoided.

the control valve is structurally especially simple if at least some elements of the control valve, in particular the valve needle, valve element and/or shield, have an essentially rotationally symmetrical shape. A rotationally symmetrical shape is an especially favorable embodiment for a control valve, and the shield of the invention can likewise be adapted well to this shape. Accordingly, the flows in the region of the control valve, and especially in the region of the valve plate, have an essentially rotationally symmetrical behavior.

The control valve can be used especially advantageously if it is a quantity control valve for metering fuel in a fuel system of an internal combustion engine. Then the operating frequency of the control valve and the incident pressures and the prevailing pressure differences are all especially high. The control valve of the invention is advantageously suited to such operating conditions and to similar operating conditions.

BRIEF DESCRIPTION OF THE DRAWINGS

Exemplary embodiments of the invention will be described below in conjunction with the drawings. In the drawings.

DESCRIPTION OF THE PREFERRED EMBODIMENTS

For functionally equivalent elements and sizes in all the drawings, even in different embodiments, the same reference numerals are used.

Figure 1:
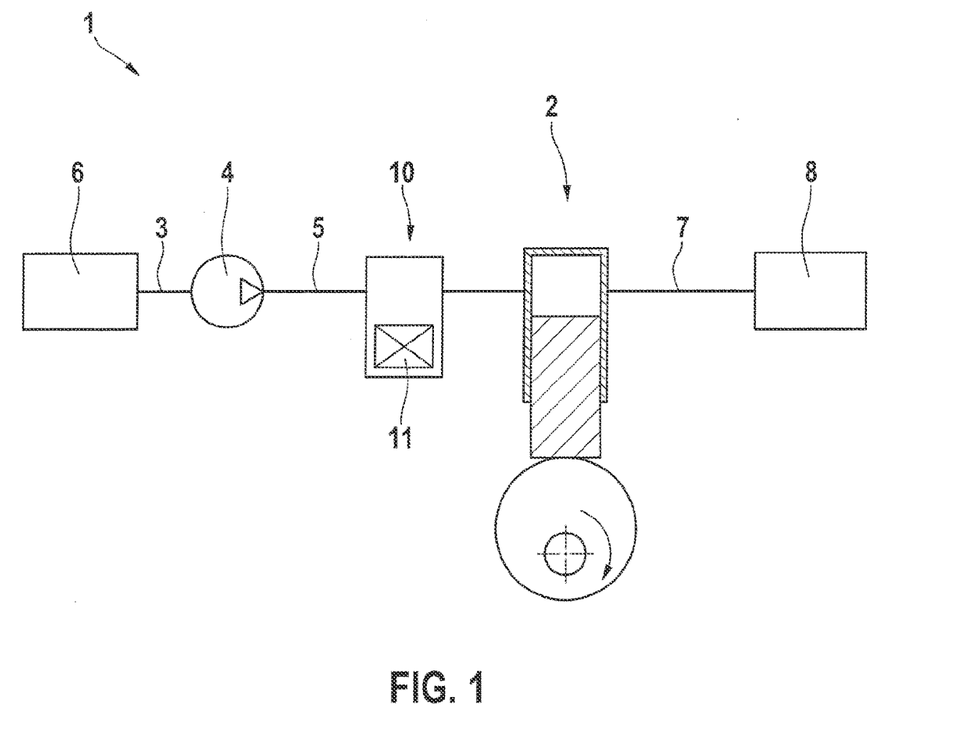
FIG. 1 shows an overview of a fuel system with a high-pressure pump, a common rail system, and a quantity control valve.

FIG. 1 shows a fuel system 1 of an internal combustion engine in a highly simplified illustration. A high-pressure pump 2 (not further shown) embodied as piston pump communicates upstream with a fuel tank 6, via a suction line 3, a prefeed pump 4, and a low-pressure line 5. Downstream, a high-pressure reservoir 8 ("common rail") is connected to the high-pressure pump 2 via a high-pressure line 7. A control valve 10 embodied as a quantity control valve, having an electromagnetic actuating device 11—hereinafter called an electromagnet 11—is disposed hydraulically between the low-pressure line 5 and the high-pressure pump 2 and forms the inlet valve of the high-pressure pump. Other elements, such as the outlet valve of the high-pressure pump 2, are not shown in FIG. 1. It is understood that the quantity control valve 10 can be embodied together with the high-pressure pump 2 as a structural unit.

In operation of the fuel system 1, the prefeed pump 4 pumps fuel from the fuel tank 6 into the low-pressure line 5. In the process, the quantity control valve 10 determines the quantity of fuel delivered from the high-pressure pump 2 to the high-pressure reservoir 8 by remaining intermittently open in compulsory fashion during a delivery stroke.

Figure 2:
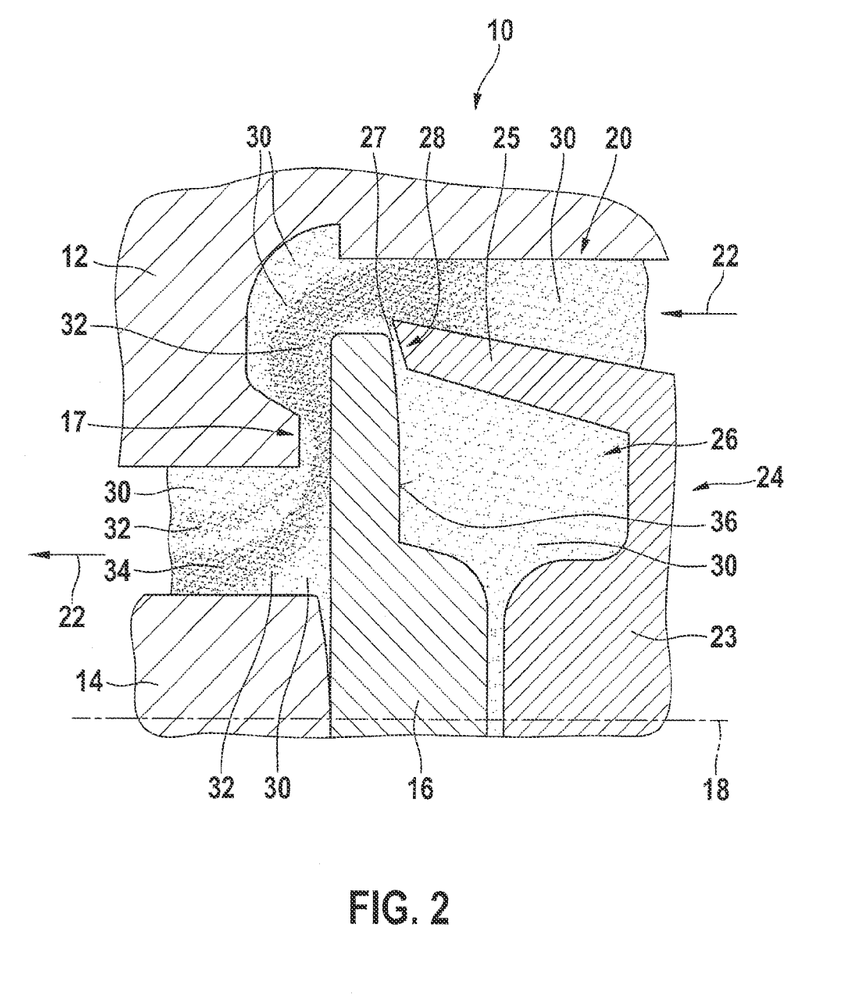
FIG. 2 shows a control valve in a sectional view in a first embodiment, showing flow speeds.

FIG. 2 shows a portion of the quantity control valve 10 on the intake side of the high-pressure pump 2. It can be seen that the quantity control valve 10 has a housing 12, a valve needle 14, a platelike valve element 16, a valve seat 17 ("seat of repose") cooperating with the valve element, and a shield 24. In terms of the drawing, the high-pressure pump 2 is disposed to the right of the control valve 10, and the low-pressure line 5 coming from the prefeed pump 4 is disposed on the left. A flow channel 20 is located in the upper or middle region of FIG. 2 and has a passage for the fuel that in terms of the drawing is substantially horizontal. The flow channel 20, over its course, has various cross-sectional shapes and cross-sectional areas.

The shield 24 includes a central portion 23 and an annular shield portion 25, which here is embodied conically and in some regions forms a radially inner wall of the channel 20, which at least at this point is annular. It is also conceivable to produce the shield 24 as a molded sheet-metal part. However, that is not shown in FIG. 1. A region 26 located radially inside the shield 24 here forms a "fluid chamber" and is surrounded by the shield 24, with its shield portion 25 and central portion 23, and by the valve element 16. The region 26 is filed with fuel and communicates with the flow channel 20 via a constriction 27, which is also formed between the valve element 16 and the shield portion 25 when the valve element 16 is in the open position, as shown in FIG. 2. The constriction 27 is embodied in FIG. 2 as a radially encompassing gap and simultaneously forms a channel 28.

The elements of the control valve 10 here have an essentially rotationally symmetrical shape around a center line 18. In the drawing, only half of a sectional view is shown. This applies to FIGS. 3-8 described below as well.

The sectional view in FIG. 2—as in FIGS. 3-8 described below—corresponds to a simulation model for calculating flow speeds and pressure distributions and in the present instance does not show any stop for the valve needle 14 or the valve element 16 for the open position of the control valve 10. Such a stop could be created for instance by means of a radially symmetrical shaping of the central portion 23, so that the valve element 16 in the open position shown can sit directly on the central portion 23 of the shield 24. A helical spring (not shown), which urges the valve element 16 in the direction of the closed position, can be accommodated in this region 26 as well. However, neither is absolutely necessary.

The view in FIG. 2 corresponds—as mentioned above—to a control valve or quantity control valve 10 located in the open position. The valve seat 17 identifies a closed position, not described in further detail, of the valve element 16. The valve needle 14 and the valve element 16 are axially movable and are located in an extreme right-hand position in terms of the drawing. The shield 24 is secured to the housing.

The high-pressure pump 2 and the quantity control valve 10 function as follows: In an intake phase of the high-pressure pump 2, fuel is fed from left to right in the drawing. This corresponds to the "normal" flow direction through the control valve 10. The function of the quantity control valve 10 is then essentially equivalent to that of a normal, spring-loaded inlet intake valve, of the typical known kind in piston pumps. In an ensuing pumping phase, a fuel pressure is built up in the high-pressure pump 2. As a result, some of the previously aspirated fuel flows back in the direction of the arrows 22 (backflow), as long as the valve element 16 is compelled to be in the open position shown by of the action by the valve needle 14, which in turn is put into this position by the electromagnetic actuating device 11.

In the flow channel 20, above all during the backflow just described, various flow speeds of the backflowing fuel arise as a consequence of hydraulic effects. The various flow speeds are illustrated in FIG. 2 by different degrees of blackening. There are regions of relatively low flow speeds 30, medium flow speeds 32, and relatively high flow speeds 34. Additional degrees of shading in FIG. 2 and the attendant flow speeds are shown without reference numerals. Identical degrees of blackening of the shadings do not necessarily mean identical flow speeds. Because of the black-and-white illustration here, the drawing in FIG. 2 is not reversibly unambiguous in each case. More simply, and in general, it should be noted that regions of relatively high flow speeds are located predominantly near the middle of a given cross section of the flow channel 20.

It can be seen that the backflow indicated by the arrows 22 stays essentially away from an axial end face 36 of the valve element 16, because of the action of the shield 24 or the shield portion 25. The flow is accordingly steered around the valve element 16. As a result the pressure of the fuel exerted on the axial end face 36 is comparatively low. The pressure loss as fuel passes through the flow channel 20 is comparatively slight overall.

Figure 3:
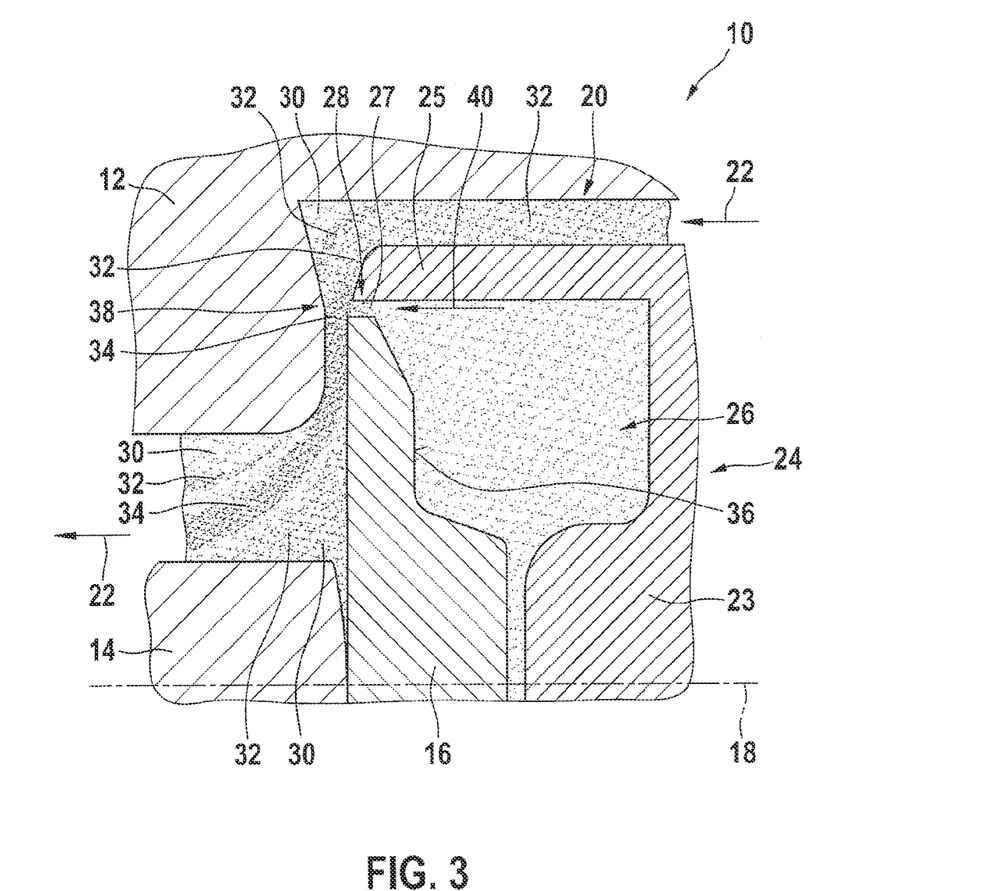
FIG. 3 shows a control valve in a sectional view in a second embodiment, showing flow speeds.

FIG. 3 shows an similar embodiment of the control valve 10 to FIG. 2, in which the housing 12, the valve element 16, the shield 24 and the shield portion 25 have a different geometry from FIG. 2. The geometries of the flow channel 20, the constriction 27, the channel 28, and the fuel-filled region 26 are different as well. In particular, in the vicinity of the constriction 27 or channel 28, the flow channel 20 has a throttle restriction 38, which narrows the cross section for the backflow. The flow speeds of the fluid or fuel are shown similarly to FIG. 2. Accordingly, the aforementioned limitations in terms of the drafting of the drawing apply here as well.

The basic function of the control valve 10 of FIG. 3 is comparable to that of FIG. 2; however, the flow speeds and the hydraulic effects and pressures are different in some locations as a consequence of the different geometries. In particular, the region of the throttle restriction 38 has a higher fluid speed, compared to the other portions of the flow channel 20. As a consequence, a static pressure of the fuel in the region of the constriction 27 is comparatively low. Thus a suction effect on the fuel located in the region 26 arises in the direction of the arrow 40. As a consequence, the hydraulic pressure in the region 26 decreases, and the axial force acting on the axial end face 36 of the valve element 16 decreases accordingly. Overall, the axial end face 36 is thus relieved in two ways. First, by the action of the shield portion 25, which keeps the backflow essentially away from the axial end face 36. Second, by the suction effect and the attendant reduction in the hydraulic pressure in the region 26. In a manner similar to the embodiment of the control valve 10 of FIG. 2, the pressure loss as the fuel passes through the flow channel 20 is comparatively slight.

Unlike what is shown in FIG. 2, the shield portion 25 "clasps" the valve element 16 in the radial direction, and correspondingly, the channel 28 is oriented differently relative to the center line 18, namely essentially axially. For the generation of the suction jet effect this is of little importance, as long as the flow speeds of the backflow in the region of the throttle restriction 38 are high enough.

Figure 4:
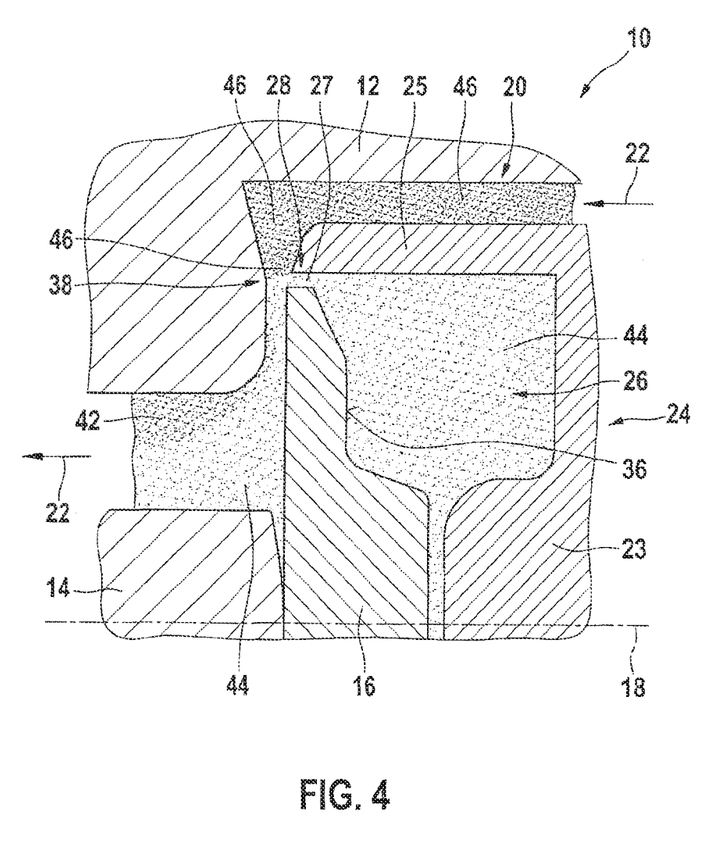
FIG. 4 shows a control valve of FIG. 3, showing a static pressure distribution.

FIG. 4 shows a control valve 10 of FIG. 3, showing a static pressure distribution of the flowing fuel, instead of flow speeds. In the drawing, the same limitations in terms of drafting mentioned in the description of FIG. 2 apply accordingly. The external (hydraulic) operating conditions of the control valve 10 of FIG. 4 correspond to those of FIG. 3. In an upper portion, in terms of the drawing in FIG. 4, of the flow channel 20, a relatively high pressure 46 prevails; in a region at the left bottom and in the region 26, a medium pressure 44 prevails; and in a region on the left in the drawings, a relatively low pressure 42 prevails. It is understood that the "medium pressure 44" is not necessarily a precise mean value of the relatively high pressure 46 and the relatively low pressure 42, but instead can be substantially below that.

Below, in conjunction with FIGS. 5-8, further static pressure distributions during the backflow of the fluid are presented in further embodiments of the control valve 10. Similarly to FIGS. 2-4, they are embodied essentially rotationally symmetrically. In terms of the drafting of the drawing, the limitations mentioned in the description of FIG. 2 apply accordingly. It is common to all of FIGS. 5-8 that in the right-hand part of the drawing—unlike in FIGS. 2-4—additional regions of the flow channel 20, some with radially extending flows, are also visible.

The basic function of the control valve 10 in FIGS. 5-8 is comparable to that in FIGS. 3 and 4; that is, besides the effect of the shield 24 or shield portion 25, a suction effect by means of the channel 28 also ensues. The flow speeds and the hydraulic effects and pressures sometimes differ, as a consequence of the different geometries. Similarly to FIGS. 2-4, the pressure loss as the fuel passes through the flow channel 20 is comparatively slight in each case.

It is also common to the embodiments of FIG. 5-8 that the shield portion 25 additionally forms a stop for the valve element 16, in each case toward the right in terms of the drawings. As a result, a stroke limitation of the valve element 16 takes place. In FIGS. 5-8, the constriction 27 shown in FIGS. 2-4 becomes a possibly persistent residual gap. The residual gap might lead to small leaks in the region 26, but this can be compensated for by the action of the channel 28.

Figure 5:
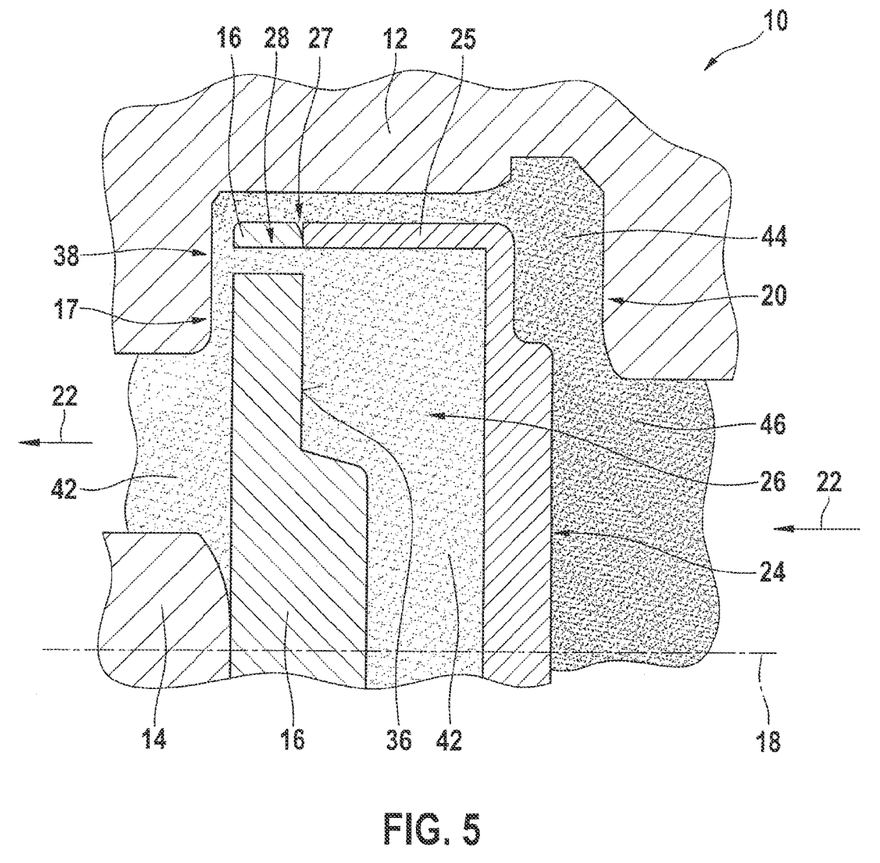
FIG. 5 shows a control valve in a sectional view in a third embodiment, showing a static pressure distribution.

FIG. 5 shows a third embodiment of the control valve 10, in which the housing 12, the valve element 16, the shield 24 and the shield portion 25 have a different geometry from FIGS. 2 and 3. The geometries of the flow channel 20, the channel 28, and the fuel-filled region 26 are different as well. The residual gap of the constriction 27 occurs in FIG. 5 at a stop of the valve element 16 on the shield portion 25 and is fluidically inactive, in the state shown in the drawing.

The channel 28 here is formed by a series of axial openings—such as bores—in the vicinity of the edge of the valve element 16, of which only one is visible in the sectional view of FIG. 5. The throttle restriction 38 is located in the region of the valve seat 17 of the valve element 16 and in a bypass around the channel 28, which channel—in a manner similar to the other FIGS. 2-8—is oriented essentially orthogonally to the backflow.

Along the flow channel 20 in FIG. 5, a pressure reduction ensues in the backflow direction 22, from a relatively high pressure 46 via a medium pressure 44 to a relatively low pressure 42 in the left part of the drawing. In the region 26, a relatively low pressure 42 prevails. Similarly to FIG. 2 or FIG. 3, the pressure loss as the fuel passes through the flow channel 20 is comparatively slight overall. Since the channel 28 discharges into the region 42 of high flow speed and thus relatively low static pressure, the suction effect already described ensues again and leads to a pressure reduction in the region 26.

Figure 6:
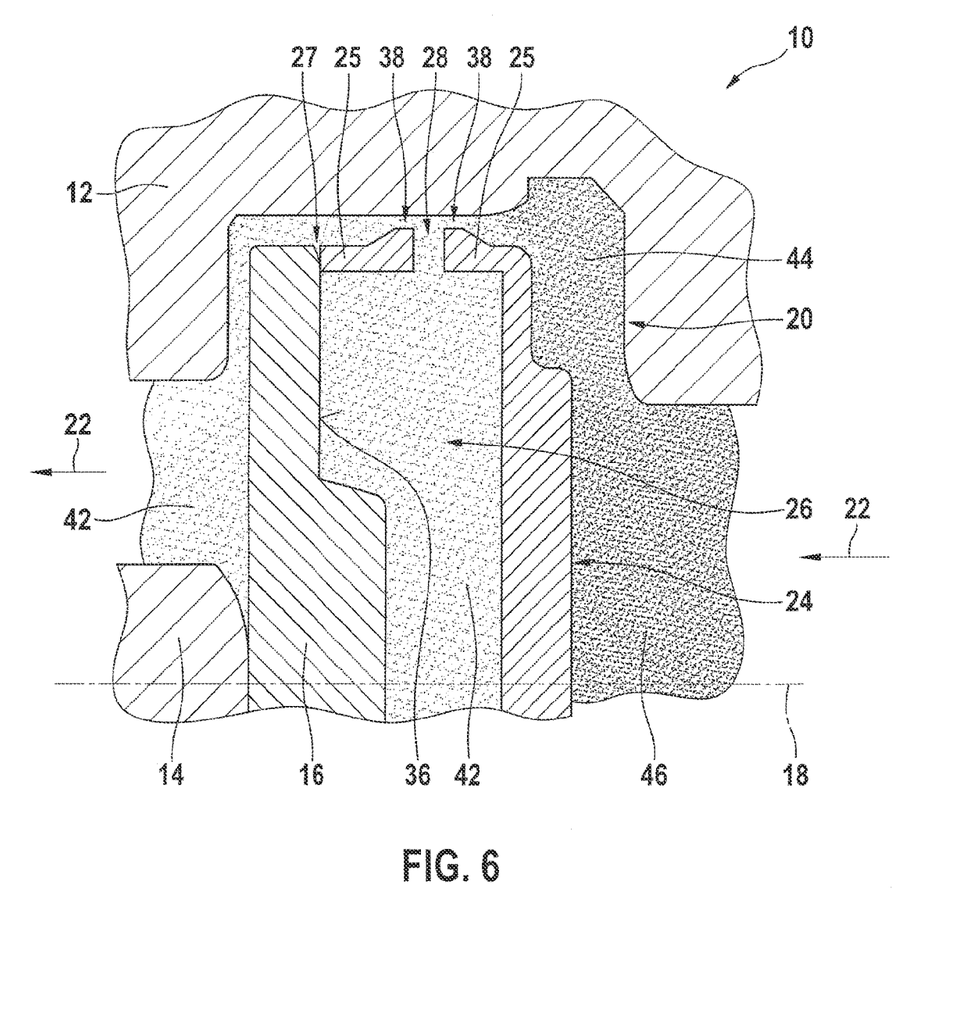
FIG. 6 shows a control valve in a sectional view in a fourth embodiment, showing a static pressure distribution.

FIG. 6 shows a fourth embodiment of the control valve 10, in which the channel 28 is extended all the way through the shield portion 25 and radially outward into the channel 20. The throttle restriction 38 is formed her by two encompassing luglike shapings of the shield portion 25. The pressure distribution shown is approximately comparable—except for the surroundings of the throttle restriction 38—to FIG. 4; see reference numerals 42, 44 and 46 in the drawing. Since the channel 28 discharges into the region of the throttle restriction 38 having a high flow speed and thus a relatively low static pressure, the result again is the suction effect already describe above, which leads to a pressure reduction in the region 26.

Figure 7:
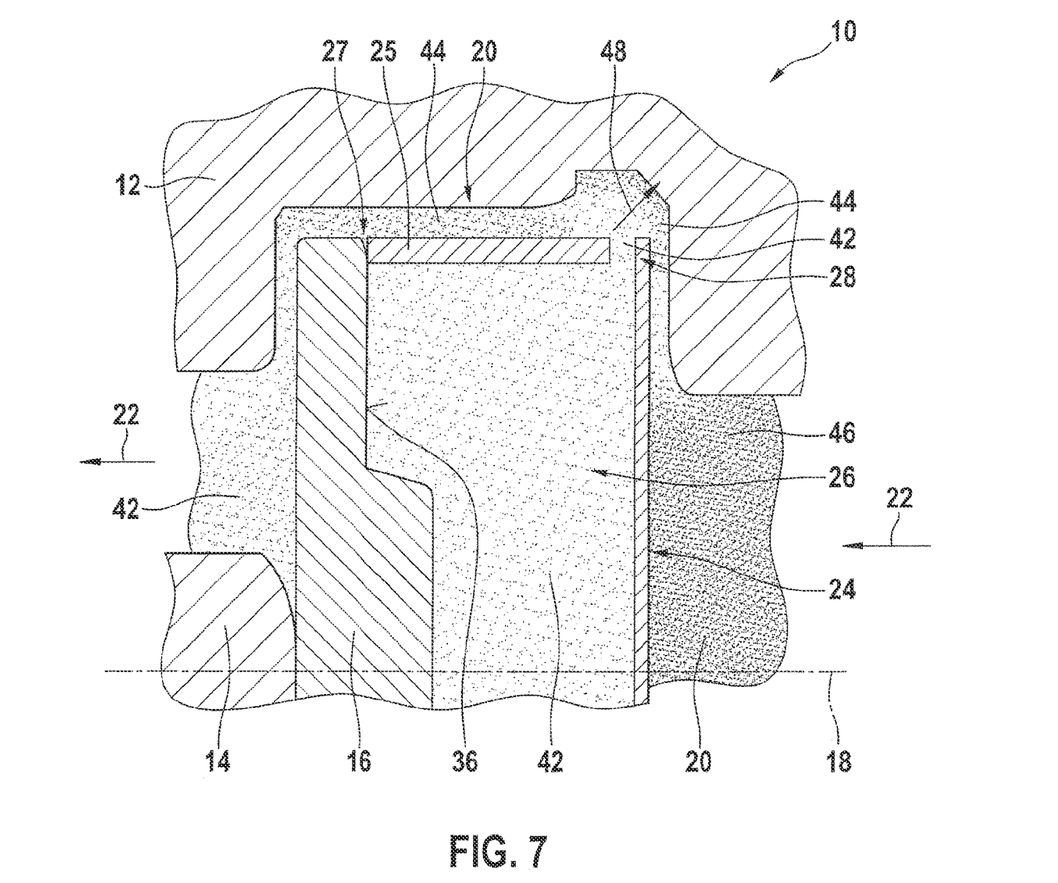
FIG. 7 shows a control valve in a sectional view in a fifth embodiment, showing a static pressure distribution.

FIG. 7 shows a fifth embodiment of the control valve 10, in which in a flow region at top right in the drawing, the backflow is deflected at approximately a right angle. The channel 28 discharges then into the radially inner region of the crooked flow, in which a pressure gradient can therefore be established in the radial direction. This is illustrated in the drawing by an arrow 48. Thus in the radially inner flow region, a comparatively low pressure ensues, which continues by means of the channel 28 into the region 26 located inside the shield 24.

Figure 8:
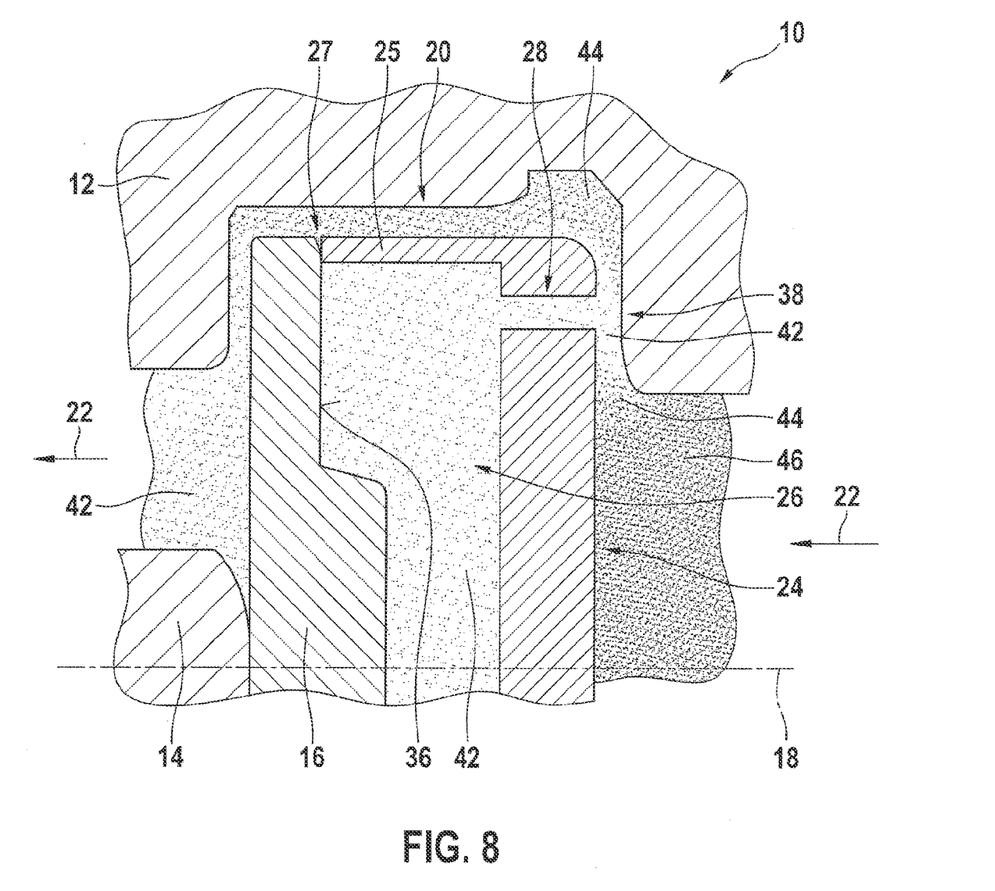
FIG. 8 shows a control valve in a sectional view in a sixth embodiment, showing a static pressure distribution.

FIG. 8 shows a sixth embodiment of the control valve 10, in which the channel 28 is formed by one or more axially oriented openings in the shield 24. The function is analogous to the other embodiments.

It is understood that FIGS. 2-8 are merely examples of the control valve 10. The described actions of the shield 24 and/or the suction effect can also be implemented with different geometries from FIGS. 2-8. In particular, combinations of the embodiments shown in FIGS. 2-8 are also possible according to the invention.

The foregoing relates to the preferred exemplary embodiments of the invention, it being understood that other variants and embodiments thereof are possible within the spirit and scope of the invention, the latter being defined by the appended claims.

What is claimed is:

1. A control valve, in particular for metering a fluid for a delivery pump arranged downstream, having a flow channel, an axially movable valve needle, and a valve element that can be urged in an opening direction by the valve needle and is disposed in the flow channel, and when the valve element is actuated in the opening direction by the valve needle, the flow channel can at least temporarily experience a backflow of the fluid through it counter to the opening direction,
   wherein the valve element is formed as a valve plate,
   wherein a fluidically active shield is positioned to keep the backflow at least partly away from a face of the valve element, a fuel-filled fluid chamber being defined radially within the shield,
   wherein the shield blocks at least a central portion of the face of the valve plate from the backflow and the backflow is directed along a radially outer side the shield, and
   wherein in an open position of the control valve, the valve plate abuts the central portion of the shield while an annular connector channel is formed connecting the chamber with the flow channel.

2. The control valve according to claim 1, wherein the shield has an encompassing shield portion.

3. The control valve according to claim 2, wherein the shield portion is conical along a region extending up to the valve plate in the backflow direction.

4. The control valve according to claim 3, wherein the shield or at least the shield portion is a molded sheet-metal part.

5. The control valve according to claim 1, wherein the connector channel is formed in at least some regions by an annular gap between the valve element and the shield or the shield portion.

6. The control valve according to claim 2, wherein the shield or at least the shield portion is a molded sheet-metal part.

7. The control valve according to claim 1, wherein the connector channel is formed in at least some regions by at least one opening in the valve element.

8. The control valve according to claim 1, wherein the connector channel extends axially between the flow channel and the fuel-filled fluid chamber.

9. The control valve according to claim 1, wherein at least some elements of the control valve, in particular the valve needle, valve element and/or shield, have a rotationally symmetrical shape.

10. The control valve according to claim 1, wherein the control valve is a quantity control valve for metering fuel in a fuel system of an internal combustion engine.

11. A control valve, in particular for metering a fluid for a delivery pump arranged downstream, having a flow channel, an axially movable valve needle, and a valve element that can be urged in an opening direction by the valve needle and is disposed in the flow channel, and when the valve element is actuated in the opening direction by the valve needle, the flow channel can at least temporarily experience a backflow of the fluid through it counter to the opening direction,     wherein a fluidically active shield is positioned to keep the backflow at least partly away from a face of the valve element, a fuel-filled fluid chamber being defined radially within the shield, and     wherein a connector channel between the chamber and the flow channel is formed at least in part by a gap between the valve element and the shield, the gap arranged so that fluid flow through the gap is axial, parallel to a center line of the control valve, between the flow channel and the chamber.

12. The control valve according to claim 11, wherein the shield has an encompassing shield portion.

13. The control valve according to claim 12, wherein the shield portion is conical along a region extending up to the valve plate in the backflow direction.

14. The control valve according to claim 13, wherein the shield or at least the shield portion is a molded sheet-metal part.

15. The control valve according to claim 12, wherein the shield or at least the shield portion is a molded sheet-metal part.

16. The control valve according to claim 11, wherein the gap at least partially forming the connector channel is formed is an annular gap.

17. The control valve according to claim 11, wherein at least some elements of the control valve, in particular the valve needle, valve element and/or shield, have a rotationally symmetrical shape.

18. The control valve according to claim 11, wherein the control valve is a quantity control valve for metering fuel in a fuel system of an internal combustion engine.

19. The control valve according to claim 11, wherein the valve element is formed as a valve plate.

\* \* \* \* \*